United States Patent [19]

Dreibelbis

[11] Patent Number: 4,937,394

[45] Date of Patent: Jun. 26, 1990

[54] SILICA CATALYST SUPPORTS FOR HYDRATION OF ETHYLENE TO ETHANOL

[75] Inventor: John A. Dreibelbis, Wattsburg, Pa.

[73] Assignee: Mallinckrodt, Inc., St. Louis, Mo.

[21] Appl. No.: 228,123

[22] Filed: Aug. 4, 1988

Related U.S. Application Data

[60] Division of Ser. No. 89,939, Aug. 25, 1987, Pat. No. 4,783,435, which is a continuation of Ser. No. 866,444, May 23, 1986, abandoned, which is a division of Ser. No. 756,580, Jul. 19, 1985, Pat. No. 4,617,060, which is a continuation of Ser. No. 603,262, May 28, 1984, abandoned, which is a continuation of Ser. No. 383,616, Jun. 1, 1982, abandoned, which is a continuation of Ser. No. 82,530, Oct. 9, 1979, abandoned.

[51] Int. Cl.$^5$ .................... C07C 29/04; C07C 31/08
[52] U.S. Cl. ................................................ 568/896
[58] Field of Search .................................. 568/896

[56] References Cited

U.S. PATENT DOCUMENTS

| | | | |
|---|---|---|---|
| 2,579,601 | 12/1951 | Nelson et al. | 568/896 |
| 2,680,721 | 6/1954 | Broge et al. | 252/313 |
| 3,208,823 | 9/1965 | Baker et al. | 23/182 |
| 3,459,678 | 8/1969 | Hagemeyer et al. | 568/896 |
| 3,554,926 | 1/1971 | Statman et al. | 568/896 |
| 3,804,647 | 4/1974 | Elmer et al. | 106/54 |
| 3,855,172 | 12/1974 | Iler et al. | 260/39 |
| 4,052,334 | 10/1977 | Mockett | 252/429 |
| 4,056,488 | 11/1977 | Mitchell eet al. | 252/449 |
| 4,070,283 | 1/1978 | Kirkland | 210/31 |
| 4,105,426 | 8/1978 | Iler et al. | 65/18 |
| 4,218,571 | 8/1980 | Mitchell et al. | 585/277 |
| 4,230,679 | 10/1980 | Mahler et al. | 423/325 |
| 4,330,519 | 5/1982 | Takahashi et al. | 423/335 |
| 4,409,148 | 10/1983 | Qualeatti et al. | 568/885 |

FOREIGN PATENT DOCUMENTS 2237015 2/1973 Fed. Rep. of Germany ...... 568/896

OTHER PUBLICATIONS

Morrison and Boyd, *Organic Chemistry*, 3d Ed., pp. 183–184, 191.

Kirk-Othmer, *Encyclopedia of Chemical Technology*, 2d Ed. (1965), vol. 8, pp. 434–436.

*Primary Examiner*—J. E. Evans
*Attorney, Agent, or Firm*—Bernard, Rothwell & Brown

[57] ABSTRACT

Novel, composited silica catalyst supports suitable for commercial utilization, which may typically have an average pore diameter in the range of about 100 to about 5000 Angstroms, an advantageously high surface area in the range of about 30 to about 125 square meters per gram and a bulk density in the range of about 0.3 to about 0.6 gram per cubic centimeter, are made by mixing amorphous silica powder having an average particle size in the range of about 10 to about 50 millimicrons with a medium suitable for binding the silica powder. The mixture of silica powder and binder is formed into suitable, macrosized catalyst support shapes by press molding, extrusion, tableting and like forming means. The shaped mixture of silica powder and binder is calcined to form the novel silica catalyst supports.

2 Claims, No Drawings

SILICA CATALYST SUPPORTS FOR HYDRATION OF ETHYLENE TO ETHANOL

This is a division of application Ser. No. 089,939, filed August 25, 1987, now U.S. Pat. No. 4,783,455, which was a continuation of Ser. No. 866,444, filed May 23, 1986, now abandoned, which was a divisional of Ser. No. 756,580, filed July 19, 1985 now U.S. Pat. No. 4,617,060, which was a continuation of Ser. No. 603,262, filed April 28, 1984, now abandoned, which was a continuation of Ser. No. 383,616, filed June 1, 1982 now abandoned, which was a continuation of Ser. No. 082,530, filed October 9, 1979, now abandoned.

This invention relates to calcined silica catalyst supports having an advantageously large surface area and beneficial average pore diameter. The invention is also concerned with an economical and efficient method for the manufacture of these composited silica catalyst supports from fine amorphous silica powders having an average particle size in the range of about 10 to about 50 millimicrons. The process of the instant invention is capable of producing silica catalyst supports comprised predominantly of silica having variable parameters of pore size, surface area and bulk density depending upon the properties of the particular amorphous silica powder employed; the calcining times and temperatures utilized, and the method used for forming the microsized catalyst support. A typical, commercial-viable, silica support produced in accordance with the process of the instant invention may have a surface area in the range of about 30 to about 125 square meters per gram, an average pore size diameter in the range of about 100 to about 5000 Angstroms, and a bulk density in the range of about 0.4 to 0.6 gram per cubic centimeter.

Prior art silica catalyst supports having a greater than 96% silica can generally be catagorized as one of two types; gels, which have a very high surface area with very small average pore size, and fused silica, which generally has a low surface area with a large average pore size. Silica gels are primarily used as desiccants. In catalyst support applications the extremely small pore size, ranging in the area of 20–80 Angstroms, makes it difficult to deposit the active catalytic agent upon these gels. The very small pore size of the gels inhibits diffusion of the active catalytic agent into the pores thereby inhibiting deposition of the active catalyst agent on the catalyst body. Additionally, the small pore size inhibits diffusion of the reactants into the catalyst body during the catalysis process thereby decreasing the utility of silica gel catalyst bodies in commercial catalysis reactions. Further, silica gels, being hard and brittle, do not lend themselves to formation of macrosized particles by tableting or extrusion and are generally available only as powders, granules or beads formed by other means that limit the available shapes for the product. This limitation on the shape of silica gel catalyst supports restricts their utility to applications where powders, granules, or beads are compatible with the catalysis reaction process and equipment.

Fused silica catalyst supports have a very low surface area, in the range of about 0.5 to about 3 square meters per gram, which reduces the surface area available for deposition of the active catalytic agent. Additionally, the high bulk density of fused silica catalytic supports requires the utilization of a greater weight of catalytic support material to equal the available active catalytic surface area provided by the silica support of the instant invention. Further, the large pore size of fused silica catalyst supports, generally in the range of about 35,000 to about 40,000 Angstroms, renders it more difficult to maintain the active catalytic agent on the catalyst support during the catalysis reaction process. Such fused silica catalyst supports are exemplified by the Catalyst Carrier Type SMT Silica Body marketed by The Carborundum Company.

The silica catalyst support of the instant invention provides intermediate ranges, relative to conventional silica gel or fused silica catalyst supports, for both average pore diameter and surface area which advantageously overcome the above defined limitations of presently available silica catalyst supports. The average pore size range of the product of the instant invention, being in the range of about 100 to about 5000 Angstroms, facilitates deposition of the active catalytic agent and permits enhanced contacting of the catalytic agent by the reactants during the catalysis reaction, unlike conventional silica gel catalyst supports. The surface area of the product of the invention, being in the range of about 30 to about 125 square meters per gram, enhances deposition of the active catalytic agent and provides significantly increased active sites for the catalysis reaction. Additionally, the silica catalyst support of the invention is capable of providing a formed macrosized catalytic support body, e.g., in the form of tablets or extrudates, unavailable for silica gels and possesses a bulk density significantly lower than fused silica catalyst supports.

Silica catalyst supports are advantageously employed in catalysis reactions wherein one or a plurality of the reactants are strong acids or strong bases. The silica catalyst support of the instant invention is more readily adaptable for such applications in view of its novel physical properties and may be advantageously be employed, for example, as a catalyst support for phosphoric acid which is used as a catalyst for the hydration of ethylene to ethyl alcohol. When phosphoric acid is used as the catalytic agent in the hydrogenation of ethylene, the phosphoric acid may generally comprise a minor portion, for instance about 30 to 40%, say about 35% by weight of the total weight of the catalytic support body and catalyst. The silica catalyst support of the invention is not limited to catalysis reactions wherein a one or a plurality of the reactants are strong acids or bases, and may advantageously used to support a wide range catalytic agents including for example, the noble metals in hydrogenation reactions, the non-noble Group 8 metals, e.g., copper, cobalt and nickel, and Group 5 and 6 metals such as vanadium, molybdenum, and titanium for use, for example, as oxidation catalysts. The catalytic agent is usually a minor proportion of the catalyst. The catalyst support of the invention is useful when it is compatible with the environment of the catalysis reaction and is adaptable to the process parameters required in a particular catalysis reaction.

In accordance with the instant invention the novel silica catalyst supports can be made by mixing an amorphous silica powder, e.g., a precipitated silica, having an average particle size in the range of about 10 to about 50 millimicrons with a medium suitable for binding the silica powder, forming the mixture of silica powder and binder into suitable macrosize shapes for use as a catalyst supports, and calcining the shaped composite of silica particles at sufficient temperatures in the range of, for instance, about 400° to about 1600° F. for a period of time which is temperature dependent. Generally such amorphous silica powders may also have very minor amounts of contaminants, e.g., less than 1% of refractory oxides, e.g., $Al_2O_3$ and other metal oxides. The foregoing process provides catalyst supports comprised predominantly of silica, e.g., having a silica content greater than about 96% and having variable parameters of pore size, surface area, and bulk density, and an advantageous average pore size diameter and large surface area. Typical catalyst supports of the invention may have a total or specific surface area in the range of about 30 to about 125 square meters per gram, an average pore diameter of about 100 to about 5000 Angstroms, and a bulk density in the range of about 0.3 to 0.6 grams per cubic centimeter.

Further objects, advantages, and features of the invention will be apparent in the arrangement and construction of the constituent aspects of the invention in detail as set forth herein.

The silica catalyst supports can be made by intimately mixing an amorphous silica powder and a suitable binder. The silica powder may be, for example, ultrafine silica powders having an ultimate particle size in the neighborhood of about 14 millimicrons, a surface area of about 300 square meters per gram and a bulk density as packaged of about 4 to 10 pounds per cubic foot. Such silica powders may be manufactured in accordance with the method set forth in U.S. Pat. No. 3,208,823 which discloses a method wherein the resultant silica powder has a particle size in the range of 10–20 millimicrons and a silica content of greater than 95% on an anhydrous basis. Additionally, ultra-fine, precipitated amorphous silica useful in the instant invention may be produced by the known method of mixing sodium silicate and mineral acid in a solution containing a calcium salt to limit silica polymerization and cause precipitation of very fine silica particles.

The binders utilized in making the supports of the present invention have binding and lubricating qualities compatible with the subsequent forming step of the process and may be, for example, water-soluble starch for example, Imperial Instant Starch manufactured by The A. E. Staley Manufacturing Company, polyvinyl alcohol, methyl cellulose, for example, METHOCEL marketed by The Dow Chemical Company, sodium silicate, LUDOX comprised predominantly of colloidal silica marketed by Du Pont, sugars, waxes or pitch having the requisite binding and lubricating qualities.

The respective proportions of amorphous silica powder to binder may vary depending upon the forming process to be utilized. Generally, a major portion of silica powder, e.g., about 99 to about 70% silica powder, is employed with a minor portion of binder, e.g., about 1% to about 30% binder, based on the total of these materials. The mixture subjected to the macrosize particle forming or shaping operation usually has about 40 to 90% water. It is generally preferred that the silica powder and binder be intimately mixed before the addition of water.

As presented in Examples I and II, when tableting is used to produce the silica catalyst support, water-soluble starch or an aqueous solution containing a minor amount of polyvinyl alcohol, e.g. a 5% solution, may be advantageously used as binders. The subject binders possess both the desired binding characteristics and additionally provide a lubricating function which is suitable when a tablet-forming process is used. Water soluble starch has been found to be particularly advantageous as a binder in the tablet-forming process. In the process, wherein tableting apparatus is employed to form the macrosized, catalyst support, a major amount of silica powder, e.g., about 80 to about 97% by weight, preferably about 90 to about 97% by weight can be initmately dry mixed with a minor amount of binder, e.g., about 3 to about 20% by weight of binder, in a conventional mixer, for example, a Muller-type mixer for a time sufficient to thoroughly mix the silica powder and binder, for example, approximately 10 to about 15 mintues. Water may then be added to the dry silica powder-binder mixture, in an amount sufficient to yield a resultant mixture having about 60 to 90% water. As presented in Example II, aqueous polyvinyl alcohol is used as the binder, and the polyvinyl alcohol and water are mixed and added to the silica powder in the mixer. Mixing of the composite may be continued for a time sufficient to achieve a homogeneous mixture of the silica powder, binder and water. The composite may comprise damp lumps of material ranging in size up to about 2 or somewhat more inches in diameter, which may for example, require a mixing time of approximately 15 to 20 minutes.

The mixture of silica powder, binder and water having approximately 60 to 90% water may be dried to reduce the water content to less than about 15%, preferably in the range of less than about 5%. This may be accomplished, for example, by drying the mixture in a drying oven at approximately 110° C. for about 16 hours. The dried mixture may then be granulated to pass a 12 mesh Tyler screen and dry blended with a lubricating medium to aid in the subsequent tableting operation. Generally, in the range of about 2 to about 10 weight percent of lubricant, based upon the total weight of the mixture, may be added. Such lubricants may include vegetable stearate, such as STEROTEX, powdered polyethylene such as MICROTHENE, water soluble waxes such as Carbowax, or graphite. As presented in Example I approximately 3 weight percent of lubricant, for example, Asbury No. 92 graphite, is used to form a granulated mixture having a bulk density of about 0.2 to about 0.3 gram per cubic centimeter. The mixture of graphite, silica and binder, may then be compacted to provide the mixture with a density of approximately 0.28 to 0.35 gram per cubic centimeter, preferably about 0.3 gram per cubic centimeter. The compacted material may again be granulated to pass a 12 mesh Tyler screen and then formed into tablets having a density preferably greater than 0.8 gram per cubic centimeter using tablet-forming equipment known in the art. A typical tablet formed by the foregoing process prior to calcining may have a density of about 0.8 to 0.9 gram per cubic centimeter and a crush strength in the range of approximately 8 to 21 pounds.

Extrusion may be used as a forming means for the silica catalyst supports of the instant invention. When an extrusion forming process is used, binders such as polyvinyl alcohol and methyl cellulose, may be utilized. When an extrusion forming process is employed, it has been found that a relatively larger amount of binder than used in tableting a given silica powder, may be necessary for the amorphous silica powder to be compatible with the extrusion process. To retain the high silica content of the extrudate, colloidal silica, e.g., aqueous sols of collodial silica such as LUDOX LS (low sodium) colloidal silicas, may be employed with advantage in the providing adequate binding for the extrudate. As presented in Example III below, the binder for the extrudate may be comprised of an aqueous sol of colloidal silica, e.g., LUDOX colloidal silica, which is comprised of about 30 weight percent colloidal silica and 70% water, along with another binders such as methyl cellulose or polyvinyl alcohol, e.g., a 5% solution of polyvinyl alcohol in an aqueous solution.

In preparing a mixture for extrusion a major portion of amporphous silica powder having a particle, size of from about 10–50 millimicrons, e.g., about 70 to about 90%, may be mixed with a minor amount of binder, e.g., about 10% to about 30% binder calculated on a non-water basis. In addition to the water present in the aqueous solutions of the binder, sufficient additional water is added to attain an extrudable mass, for example, the percentage of water in the mixture may be in the range of about 40 to about 60% water, preferably about 45 to about 55% water.

The composite of amorphous silica powder, binder and water is mixed, for example, in a Muller-type mixer for a time sufficient to intimately mix the constituents, e.g., about 30 minutes. The mixture is then extruded to form the desired extrudate shape. The extruded material is dried to reduce the water content of the extrudate to preferably below about 5%. This may be accomplished by drying the extrudate in a circulating gas oven at 110° C. for a time which is dependant upon the size of the extrudant material. For an extrudant size of say, $\frac{1}{8}''$, generally a drying time of 12–16 hours is sufficient to reduce the water content of the extrudate to below 5%. The extrudate material, before calcination, will generally have a bulk density of from about 0.3 to about 0.4 gram per cubic centimeter.

The formed catalyst support material may be calcined at temperatures ranging from about 400° F. to about 1600° F. The lower temperature in this range require longer firing times to achieve the desired properties of the catalyst support, for example, 12 hours. Preferably, calcining temperatures in excess of about 950° F., and preferably in the range of about 1000° F. to about 1300° F. are used for a period of from about 2 to 16 hours.

In instances where graphite is added to the silica powder-binder mixture as a lubricant, e.g., in the tableting process, it may be desirable to reduce the percentage of graphite in the final calcined support to below 1% carbon. This generally requires the use of calcining temperatures in the preferred range of about 1000° F. to about 1300° F.

The catalyst support produced in accordance with the invention is comprised predominantly of silica, having in excess of about 96 weight percent silica, preferably greater than about 98 weight percent silica. The surface area of the calcined catalyst support may be in the range of about 30 to about 125 square meters per gram preferably about 70 to 100 square meters per gram, and the support has an average pore diameter in the range of about 100 to about 5000 Angstroms, preferably about 200 to about 500 Angstroms. The bulk density of the calcined silica support may be in the range of about 0.3 to 0.6 gram per cubic centimeter, and for catalyst supports made by the tablet-forming process a bulk density in the range of about 0.45 to 0.55 gram per cubic centimeter is preferred.

Silica catalyst supports having these physical characteristics can advantageously be utilized as supports in a wide variety of catalysis reactions to provide catalytic support properties which are superior to presently available high silica catalyst supports. The following examples are presented to illustrate the invention and do not, nor are they intended to, limit the scope of the invention to the exemplified data.

EXAMPLE I 2,500 grams of amorphous silica powder having an average particle size in the range of 10 to 50 millimicrons is dry blended with 125 grams of water-soluble starch in a Muller mixer for approximately 15 minutes. 5,700 grams of water is added to the mixture and mixed for an additional 20 minutes forming damp lumps of material of up to 2 inches in diameter. These lumps contain approximately 60–70% moisture. The lumps are dried at approximately 110° C. for approximately 16 hours to reduce the moisture content to below 15% water and preferably below 5% water. The dried lumps of silica and binder are granulated to pass a 12 mesh Tyler screen and dry blended with approximately 3 weight percent graphite lubricant, e.g., Asbury No. 92 graphite. The density of this combined granulated product is approximately 0.24 gram per cubic centimeter. The mixture of granulated silica-binder and graphite is compacted to a density of approximately 0.30 gram per cubic centimeter. The compacted silica-binder and graphite is then granulated to pass a 12 mesh Tyler screen, and is tableted in a conventional tableting machine to a density of greater than 0.8 gram per cubic centimeter and preferably approximately 0.85 gram per cubic centimeter. Generally, the length to diameter ratio of the tablets is from 0.8 to 1.0. Typical tablets made utilizing conventional tableting apparatus may have the following properties:

| | |
|---|---|
| weight | 0.292 gram |
| length | 0.258 inch |
| diameter | 0.325 inch |
| density | 0.84 gram per cubic centimeter |
| crush strength | 21 pounds |

The tablets are then charged to an electric furnace and calcined at a temperature of 1200° F. for a period of 5 hours. The calcinated silica support will have the following typical properties:

| | |
|---|---|
| weight | 0.253 gram |
| length | 0.245 inch |
| diameter | 0.308 inch |
| density | 0.85 gram per cubic centimeter |
| surface area | 75 meters squared per gram |
| bulk density | 0.53 gram per cubic centimeter |
| pore volume | 0.68 cubic centimeters per gram |
| average pore diameter | 350 Angstroms |

EXAMPLE II 540 grams of water and 12 grams of a 5% aqueous solution of polyvinyl alcohol are mixed and added to 300 grams of amorphous silica powder having an average particle size in the range of 10 to 50 millimicrons, and mixed in a Muller-type mixer for a sufficient time to obtain a homogeneous mixture, e.g., about 20 minutes. Sufficient additional water may be added to achieve a mixture having 80 to 90% water. The mixture is dried at 110° C. for about 16 hours to reduce the moisture content of the mixture to less than 5%. The dried mixture of silica and binder is granulated to pass a 12 mesh Tyler screen and dry blended e.g., Asbury No. 92 graphite. This mixture may be precompacted or fed directly to a tableting machine to achieve a tablet density prior to calcining of about 0.88 gram per cubic centimeter. Typical tablets made utilizing conventional tableting apparatus may have the following properties:

| | |
|---|---|
| weight | 0.76 gram |
| length | .190 inch |
| diameter | .188 inch |
| density | .88 gram per cubic centimeter |
| crush strength | 8 pounds |

The tablets are then charged to an electric furnace and calcined at a temperature of 1200° F. for approximately 3 hours. The calcined silica support will have the following typical properties:

| | |
|---|---|
| weight | .068 gram |
| length | .186 inch |
| diameter | .185 inch |
| crush strength | 14 pounds |
| density | .83 gram per cubic centimeter |
| surface area | 100 meters squared per gram |
| bulk density | .53 gram per cubic centimeter |
| pore volume | .76 cubic centimeter per gram |
| average pore diameter | 320 Angstroms |

EXAMPLE III

A mixture of 2265 grams of a 5% aqueous polyvinyl alcohol solution and 2,000 grams of Ludox L.S. (colloidal silica) and 400 grams of water is added to 2,500 grams of amorphous powder silica having an average particle size in the range of 10–50 millimicrons in a Muller mixer and mixed for approximately 30 minutes. The mixture is then extruded using conventional extrusion equipment. The extrudate should be somewhat brittle having the capacity of being snapped off when 3 to 4 inches long. The extrudate material is then dried in a circulating oven at 110° C. for approximately 16 hours to reduce the percentage of water of the extrudate to below 5%. The dry extrudate is then calcined in an electric oven at approximately 1200° F. for approximately 5 hours. The calcined silica support will have the following typical properties:

| | |
|---|---|
| weight | .065 gram |
| length | 0.5 inch |
| diameter | 0.122 inch |
| density | 0.65 gram per cubic centimeter |
| surface area | 120 meters squared per gram |
| bulk density | 0.37 gram per cubic centimeter |
| pore volume | 1.0 cubic centimeter per gram |
| average pore diameter | approximately 400 Angstroms |

While there has been shown and described what has been considered to be the preferred embodiments of the present invention, it will be obvious to those of skill in the art that various changes and modifications may be made therein without departing from the invention.

It is claimed:

1. In a process for the hydration of ethylene to ethyl alcohol, the improvement comprising conducting the hydration with a catalyst comprising a phosphoric acid catalytic agent and a silica catalyst support having about 96 or more percent silica, a surface area in the range consisting essentially of about 30 to about 125 square meters per gram; an average pore diameter of about 100 to about 5000 Angstroms, and a bulk density in the range of about 0.3 to 0.6 gram per cubic centimeter, said support being made by calcining a composite comprised predominantly of precipitated amorphous silica powder having an average particle size of about 10 to about 50 millimicrons.

2. The process of claim 1 wherein the phosphoric acid comprises about 30 to about 40 percent by weight of the total weight of the catalyst.

* * * * *

UNITED STATES PATENT AND TRADEMARK OFFICE
CERTIFICATE OF CORRECTION

PATENT NO. : 4,937,394
DATED : June 26, 1990
INVENTOR(S) : JOHN A. DREIBELBIS

It is certified that error appears in the above-identified patent and that said Letters Patent is hereby corrected as shown below:

Front page, Column 1, [56], line 13, "eet" should be --et--.

Column 2, line 36, delete "be" (first occurrence);
          line 64, delete "a".

Column 4, line 5, "initmately" should be --intimately--;
          line 64, "collodial" should be --colloidal--;
          line 66, delete "the" (first occurrence).

Column 5, line 33, "cinated" should be --cined--.

Column 6, line 42, "calcinated" should be --calcined--.

Column 8, line 33, after "more" insert --weight--;
          line 37, delete "consisting essentially".

Signed and Sealed this

Twelfth Day of November, 1991

*Attest:*

HARRY F. MANBECK, JR.

*Attesting Officer*  *Commissioner of Patents and Trademarks*